3,708,581
ANTI-INFLAMMATORIES
William Rodney Roderick, Libertyville, Ill., assignor to
Abbott Laboratories, Chicago, Ill.
No Drawing. Filed June 9, 1971, Ser. No. 151,482
Int. Cl. A61v 27/00
U.S. Cl. 424—263                             4 Claims

ABSTRACT OF THE DISCLOSURE 3-amino-2-pyridinethiol has been found to have excellent anti-edema, anti-pyretic and analgesic effects when administered orally to warm-blooded animals at a dosage of between 0.5 and 50 mg./kg.

DETAILED DESCRIPTION OF THE INVENTION

The present invention is directed to the use of 3-amino-2-pyridinethiol or its non-toxic acid addition salts as an anti-inflammatory in warm-blooded animals. More particularly, the present invention is directed to the process of combatting inflammation or edema in warm-blooded animals by administering to such animals afflicted with an inflammation or edema a non-toxic but effective amount of 3-amino-2-pyridinethiol or a non-toxic acid addition salt thereof. Whereas these compounds are highly potent anti-inflammatories, they also exhibit anti-pyretic and analgesic effects. In lower animals, an oral dose of 5–50 mg./kg. produces anti-pyretic and anti-inflammatory effects; in higher animals the required dose is 0.5–10.0 mg./kg. The above free base has an oral $ED_{25}$ of 8 mg./kg. as an anti-inflammatory in rats and its anti-pyretic oral $ED_{50}$ in mice is 11 mg./kg. No oral toxicity has been found for the free base at doses of 1000 mg./kg. in mice and even the intra-peritoneal $LD_{50}$ in mice is well above 1000 mg./kg.

In a simple, general embodiment, the above 3-amino-2-pyridinethiol is made from 2-chloro-3-nitropyridine by reaction with sodium sulfide. In this reaction, the chloro substituent is replaced by the thiol group and the nitro group is simultaneously reduced to the amino group.

In order to illustrate the method for preparing and using the above compound, reference is made to the following example, which, however, is not intended to limit the scope of this invention in any respect.

EXAMPLE

A solution was prepared by heating 192 grams of sodium sulfide nonahydrate in 250 ml. of water followed by filtration. The clear solution was placed in a one-liter 3-neck flask equipped with an inlet tube, a reflux condenser and a stirrer and purged with nitrogen. A solution of 31.72 grams of 2-chloro-3-nitropyridine in 250 ml. of hot methanol was prepared separately and added to the aqueous sodium sulfide in portions over a period of 15 minutes.

The mixture was then refluxed for three hours under stirring while maintaining a nitrogen atmosphere whereafter the methanol was distilled from the brown solution. The solubility of the condensation product was reduced in the residual hot aqueous solution by the addition of about 50 grams of solid sodium chloride and any disulfide formed was removed by filtration.

The cooled solution was then extracted with ether to remove any non-acidic components. The aqueous solution was then cooled in ice and acidified with about 100 ml. of acetic acid. Hydrogen sulfide evolved and a brown precipitate formed. The precipitate was collected by filtration and extracted with hot water. Cooling of the aqueous extract in ice produced tan crystals of 3-amino-2-pyridinethiol. Another crop of the same material was obtained by concentration of the aqueous solution and by further extractions of the intermediate aqueous solution with ether. The ether extracts were combined and dried over magnesium sulfate. The ether was removed by evaporation under reduced pressure to produce a yellow solid containing acetic acid. This product was recrystallized by dissolving it in hot water, decolorizing the aqueous solution with charcoal and a small amount of sodium hydrogen sulfite, filtering and cooling the solution in ice. Yellow crystals were obtained showing a melting point of 132–133.5° C. Suitable non-toxic acid addition salts are prepared by known methods; for instance by the method of Takahashi and Maki, Chem. Abstr., 52, 14622 (1958).

The anti-edema effect of this compound was established by the following procedure: Edema was produced in the paws of rats by the injection of carrageenan according to the method described in Winter et al. (Proc. Soc. Exp. Biol. Med., 1962, vol. 111, p. 544). The above compound was administered orally in dosages (6 rats per dosage) of 5, 20 and 25 mg./kg. thirty minutes prior to the administration of the carrageenan. Edema is expressed as percentage increase over normal paw size and edema inhibition is calculated from the difference between the average edema size of a control group and the average edema size of the test group. The above dosages show edema inhibition of 22%, 34% and 50%, respectively. The $ED_{25}$ (i.e., dose required to produce 25% reduction in edema size) was determined from a dosage/effect curve drawn on logarithmic graph paper and was established to be 8 mg./kg.

The anti-pyretic activity of the above compound was estbalished in the following manner: Fever is produced in rats by intramuscular injection of an aqueous suspension of brewer's yeast. After fever was stabilized, the test compound was administered orally and rectal temperatures were taken one, two and three hours after drug administration. The three hour reading was used to calculate fever percentage reduction between the test group and the control group of animals, each group comprising 4 to 6 animals. With doses of 5, 10, 25 and 50 mg./kg., fever reduction of 22%, 69%, 59% and 82%, respectively, was observed. The $ED_{50}$ (50% reduction of fever) for the above compound was found to be 11 mg./kg.

When the above base is administered in form of a non-toxic acid addition salt thereof, similar anti-edema and anti-pyretic actions are observed; however, the dosages must be based on the molecular weight of the free base to obtain the same dosage/effect curve. Specifically useful are the hydrochloride, sulfate, phosphate, citrate, acetate, tartrate and succinate salts of 3-amino-2-pyridinethiol in dosages of 0.04–0.4 mole/kg. in small animals.

While the above therapeutic effect was demonstrated by oral administration, it is to be understood that interperitoneal and intramuscular administration is similarly effective. For ease of proper and convenient dispensing, the free 3-amino-2-pyridinethiol or its non-toxic acid addition salts can easily be processed into tablets, wafers, syrups, pills or capsules for oral administration, or clear aqueous solutions suitable for injections.

I claim:
1. The process of treating a warm-blooded animal afflicted with edema or inflammation consisting essentially in orally administering to said animal a non-toxic but effective amount of 3-amino-2-pyridinethiol or a non-toxic acid addition salt thereof.
2. The process of claim 1 wherein said amount is between 0.5 and 50.0 mg./kg.
3. The process of claim 2 wherein said amount is between 0.5 and 10.0 mg./kg.
4. The process of claim 1 wherein said 3-amino-2-pyridinethiol or a non-toxic salt thereof is administered in a pharmaceutical dosage unit form.

References Cited

Chem. Abst., 6th Collective Index, 1957–1961, p. 9814S.

STANLEY J. FRIEDMAN, Primary Examiner